United States Patent
Lin et al.

(10) Patent No.: US 7,152,379 B2
(45) Date of Patent: Dec. 26, 2006

(54) TWO-PLY FLOORING HAVING A CROSS-GRAIN BOTTOM PLY

(75) Inventors: Hai Lin, Hangzhou (CN); Xufeng Xu, Hangzhou (CN); Ping Sheng Zhang, Hoffman Estates, IL (US); Hai Ping Cao, Zhejiang (CN)

(73) Assignee: Hangzhou Dazhuang Floor Co., Ltd., Hangzhou (CN)

( * ) Notice: Subject to any disclaimer, the term of this patent is extended or adjusted under 35 U.S.C. 154(b) by 27 days.

(21) Appl. No.: 09/839,078

(22) Filed: Apr. 20, 2001

(65) Prior Publication Data

US 2002/0152701 A1 Oct. 24, 2002

(30) Foreign Application Priority Data

Oct. 8, 2000 (CN) ................. 00 2 54152

(51) Int. Cl.
*E04F 15/22* (2006.01)
(52) U.S. Cl. ............... 52/403.1; 52/391; 52/581; 52/589.1; 52/591.1; 52/592.1
(58) Field of Classification Search .............. 52/480, 52/664, 390, 391, 403.1, 581, 589.1, 591.1, 52/592.1; 428/106, 60
See application file for complete search history.

(56) References Cited

U.S. PATENT DOCUMENTS

| | | | |
|---|---|---|---|
| 1,465,383 A * | 8/1923 | Walsh | |
| 1,778,069 A | 10/1930 | Fetz | |
| 2,862,255 A * | 12/1958 | Nelson | |
| 3,509,234 A * | 4/1970 | Burlant | |
| 4,332,384 A * | 6/1982 | Hasegawa | |
| 4,471,012 A * | 9/1984 | Maxwell | |
| 4,600,336 A | 7/1986 | Waller | |
| 4,796,402 A | 1/1989 | Pajala | |
| 4,810,551 A | 3/1989 | Chu | |
| 4,840,825 A | 6/1989 | Aristodimou | |
| 4,889,444 A * | 12/1989 | Pouyer | 404/34 |
| 5,020,937 A * | 6/1991 | Pouyer | 404/35 |
| 5,103,614 A | 4/1992 | Kawaguchi et al. | |
| 5,283,102 A | 2/1994 | Sweet | |
| 5,543,197 A | 8/1996 | Plaehn | |
| 5,671,575 A * | 9/1997 | Wu | |
| 5,786,063 A | 7/1998 | Shibusawa | |
| 5,822,944 A * | 10/1998 | Penland | 52/591.1 |
| 5,830,549 A | 11/1998 | Sweet | |
| 5,894,700 A | 4/1999 | Sweet | |
| 5,900,099 A | 5/1999 | Sweet et al. | |

(Continued)

FOREIGN PATENT DOCUMENTS

GB 331189 6/1930

*Primary Examiner*—Jeanette E. Chapman
*Assistant Examiner*—Yvonne M. Horton
(74) *Attorney, Agent, or Firm*—DeHeng Chen Chan, LLC.; Albert Wai-Kit Chan, Esq.

(57) ABSTRACT

A two-ply flooring plank is disclosed having two layers or "plies" with a bottom layer having a grain that runs generally transverse to a top layer (i.e., "cross-ply") to provide dimensional stability to the plank. The bottom layer includes a number of strips secured to the bottom of the top layer. The bottom layer strips are also placed with gaps between the individual strips of the second layer to allow flexibility of the flooring plank, which allows the flooring to more easily conform to irregularities in a subfloor upon which the flooring plank is mounted.

20 Claims, 3 Drawing Sheets

U.S. PATENT DOCUMENTS

| | | |
|---|---|---|
| 5,976,644 A | 11/1999 | Sanaee |
| 6,021,615 A | 2/2000 | Brown |
| 6,055,785 A * | 5/2000 | Counihan |
| 6,065,264 A | 5/2000 | Imler et al. |
| 6,115,981 A * | 9/2000 | Counihan |
| 6,156,402 A | 12/2000 | Smith |
| 6,158,185 A * | 12/2000 | Counihan |
| 6,291,078 B1 * | 9/2001 | Chen |
| 6,474,905 B1 * | 11/2002 | Smith et al. .................. 404/35 |
| 2004/0074190 A1 | 4/2004 | Lin et al. |
| 2004/0226243 A1 | 11/2004 | Lin et al. |

* cited by examiner

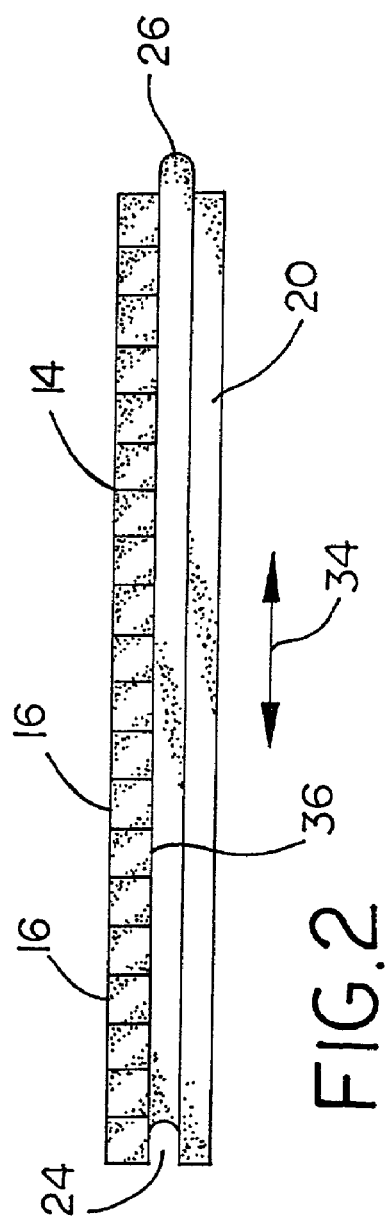
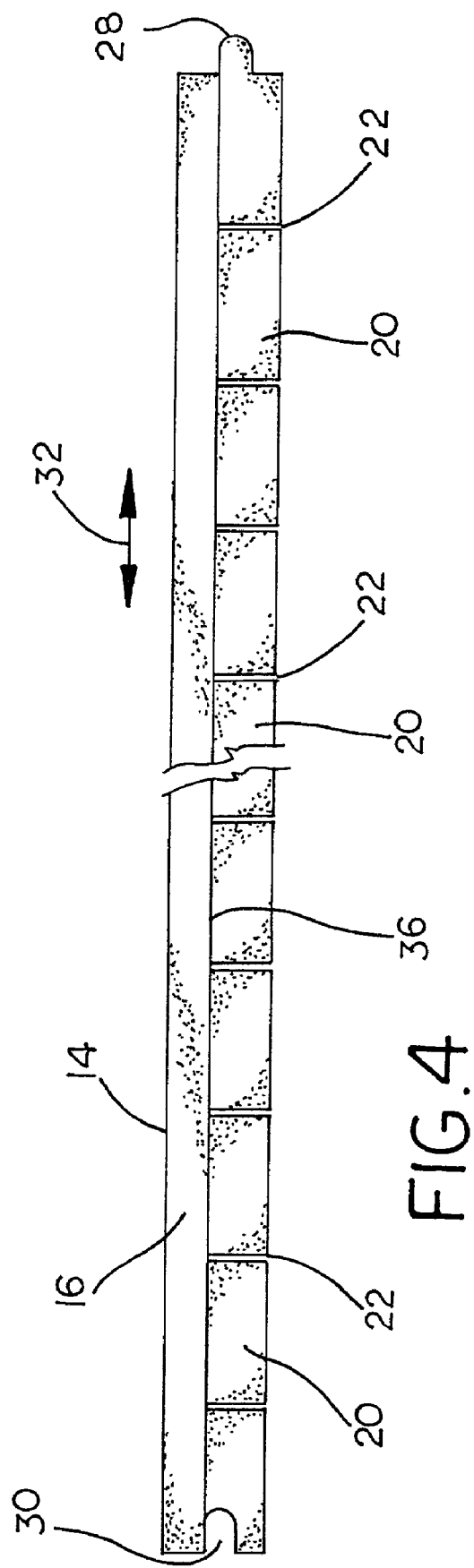

TWO-PLY FLOORING HAVING A CROSS-GRAIN BOTTOM PLY

BACKGROUND OF THE INVENTION

The present invention relates to a flooring product having a two-ply construction that is mounted to a base subfloor and, more particularly, to a bamboo or wood flooring plank with a bottom ply having a grain direction transverse to a grain direction of the top ply.

Various wood and bamboo flooring products are known in the art. Typically, wood flooring products, for example, are constructed of strips or planks that are either glued or nailed to a subfloor. The planks are typically constructed with a tongue on one side and a groove on an opposite side. When the flooring product is installed the tongue of one plank is mated with a groove on an adjacent plank to lock the planks together side-by-side to form an assembled floor.

Problems that may arise in such flooring products include warping, twisting and buckling of the flooring planks. For example, when the subfloor has irregularities and unevenness, the planks, having little flexibility, do not entirely conform to the irregularities and uneven portions of the subfloor, thus contributing to the above enumerated problems. Furthermore, flooring planks having longer lengths are more prone to warping, cupping and twisting not only after installation on the subfloor, but also prior to installation, thereby rendering the plank unusable. Thus, if the flooring plank has little or no flexibility, planks may be unusable for installation.

Previous attempts to create a flexible flooring plank have included a three-piece laminated wood floor having top, intermediate and bottom layers. The top and bottom layers have the same grain orientation while the intermediate layer located between the top and bottom layers has a grain orientation perpendicular to the grain orientation of the surrounding layers. The bottom layer includes a multiplicity of closely spaced-apart, cross-cut scores that extend across the width of the flooring plank and allow a degree of flexibility of the flooring plank. However, the cross-cut scores of this prior art flooring plank do not extend completely through the entire depth of the bottom layer to maintain a degree of rigidity of the overall flooring plank. Furthermore, since the top and bottom layers have the same grain orientation the additional third intermediate layer needs to have a perpendicular grain in order to provide stability in the transverse direction. Accordingly, the prior art utilizes a higher amount of material to construct the flooring plank while still possessing a significant degree of inflexibility of the bottom layer contacting the subfloor because the cut scores do not extend entirely through the bottom layer.

Accordingly, there is a need for a flooring product having increased flexibility that also utilizes less material as well as possessing dimensional stability in both the longitudinal and traverse directions of the flooring plank.

SUMMARY OF THE INVENTION

A flexible flooring plank constructed according to the teachings of the present application meets the above need by providing a wood or bamboo flooring plank that utilizes less wood or bamboo material while providing increased flexibility and dimensional stability.

According to an embodiment, a flooring plank includes a first layer including a first plurality of strips that are secured together. Each of the first plurality of strips has a grain extending generally in a longitudinal direction of the plank. The flooring plank also includes a second layer secured to one face of the first layer. The second layer includes a second plurality of spaced strips each having a grain extending generally transversely to the longitudinal direction of the plank.

According to another embodiment, a flooring plank includes a first layer comprising a first plurality of bamboo strips secured together in side-by-side relation, wherein each strip has a grain extending generally parallel to a longitudinal dimension of the plank. A second layer is secured to one face of the first layer, wherein the second layer includes a second plurality of strips each having a grain extending generally transverse to the longitudinal dimension of the plank.

The above described arrangements include a transverse or "cross" grain on the second layer that affords dimensional stability to the flooring plank. Additionally, the use of plurality of second strips affixed to the first layer with gaps in between each of the placed plurality of second strips affords full flexibility without the constraints of the prior art wherein the layer that provides flexibility does not contain full scores or gaps completely through the entire layer.

BRIEF DESCRIPTION OF THE DRAWINGS

FIG. 2 illustrates an end view of the flooring plank shown in FIG. 1;

FIG. 4 illustrates a side view of the flooring plank shown in FIG. 1.

DETAILED DESCRIPTION OF THE PREFERRED EMBODIMENTS

Figure 1:
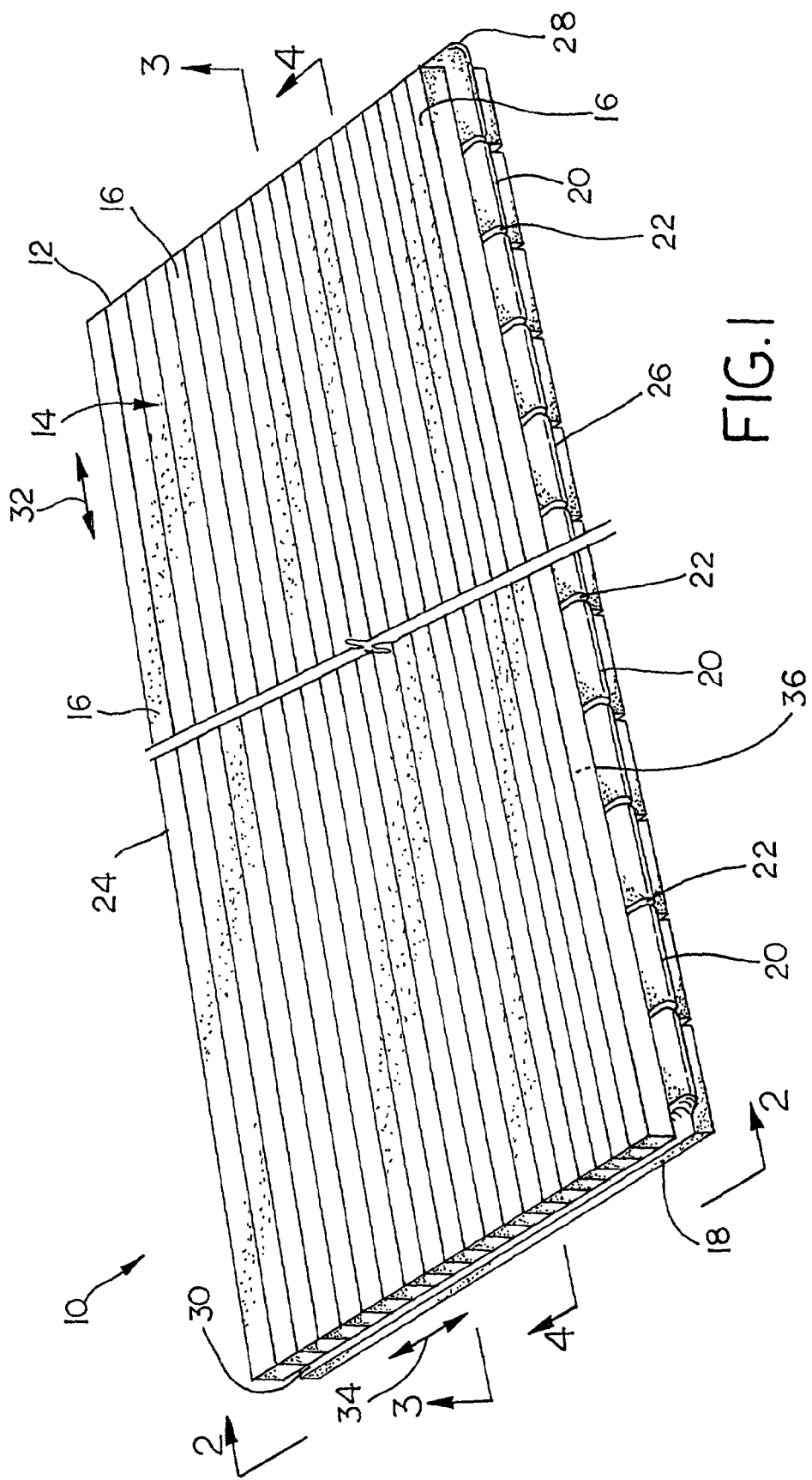
FIG. 1 illustrates a tri-metric view of a flooring plank constructed according to the teachings of the present invention.

Referring to the drawings, a flooring plank constructed in accordance with the teachings of the disclosed invention is illustrated in FIG. 1 and shown generally at reference number 10. The flooring plank 10 has two layers or "plies" including a first or top layer 12 and a second or bottom layer 18. The top layer 12 is comprised of a plurality of strips 16 that are adhered together by glue or any other suitable adhesive in side-by-side relation. Preferably, as seen in FIG. 2, these strips 16 have a generally square or rectangular cross section and are comprised of a hard grass such as bamboo, but may alternatively be comprised of wood. These strips 16 are cut and arranged such that each of the plurality of the strips has a grain extending along (i.e., substantially parallel to) a longitudinal direction of the plank 10 as indicated by arrow 32. In a preferred embodiment, all of the strips 16 are uniform size and shape and each is approximately 0.5 millimeters square.

One or more coats of a non-toxic, clear acrylic urethane are applied to a top face 14 or surface of the first layer. The urethane provides a finish that resists wear caused by traffic on such surface after installation of the plank 10 on the subfloor. The top face 14 preferably has at least four coats of acrylic urethane applied with ultraviolet curing. Alternatively, other embodiments may include application of some further finish materials such as aluminum oxide, for example, on top of the clear acrylic urethane for achieving increased wear resistance and also different finish textures. Other finishes could be used instead, as desired, to achieve various finish appearances such as matte, semi-gloss or gloss, for example. Additionally, color finish of the strips 16 may be unfinished, stained, carbonized, or some other color finishing, as desired.

Figure 3:
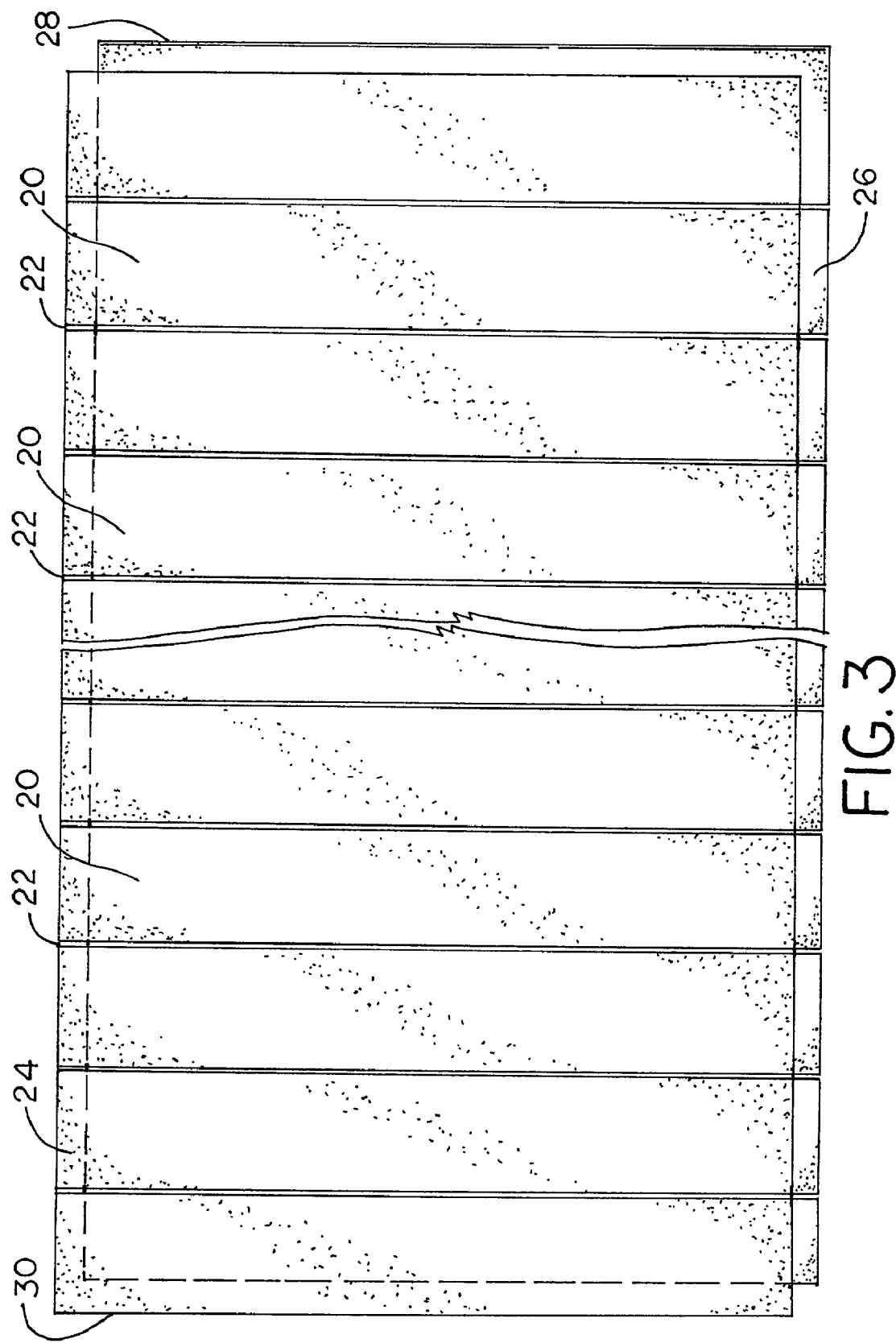
FIG. 3 illustrates a bottom view of the flooring plank shown in FIG. 1.

A plurality of second strips 20 comprising a second or bottom layer 18 is secured to an undersurface 36 of the first layer 12. As illustrated in FIGS. 1 and 3, these second layer strips 20 are spaced from one another by gaps 22 having substantially equal gap widths. Each gap width is approximately equal to one millimeter to afford flexibility of the flooring plank 10 along longitudinal direction 32. However, this predetermined gap width may be less than or greater than the one millimeter distance, depending on the desired flexibility of the flooring plank 10. In addition, the gap widths may be unequal over the length of each plank 10, if desired.

A feature of the plurality of second strips 20 is that the grain of each of the second strips 20 is oriented generally in a direction transverse or "cross-ply" to the grain direction of the plurality of first strip 16. This direction is shown as arrow 34 in FIGS. 1 and 2. Additionally, the second strips 20 are preferably comprised of bamboo or wood and may be "rough" cut since they are not visible after installation of the plank 10 on the subfloor. Accordingly, the strips 20 do not require costly finishing and may even be comprised of scrap pieces of bamboo or wood that are simply cut to the required dimensions. Alternatively, the strips 20 may be made of other natural or artificial materials, as desired.

A property of conventional constructed flooring planks is that contraction and expansion in the longitudinal direction is greater than in the transverse direction. The above-disclosed cross-ply construction, however, tends to minimize and balance the disparate rates of contraction, which affords added stability to the plank 10.

The flooring plank 10 is provided with a tongue and groove construction wherein a tongue 26 is machined substantially in the second layer 18 on one longitudinal side of the flooring plank 10 as illustrated in both FIGS. 1 and 2. A groove 24 is machined substantially in the second layer 18 on the opposing longitudinal side of the flooring plank 10. The groove 24 is of a size and shape to receive a tongue of another flooring plank 10 having the profile of the tongue 26. Additionally, the flooring plank 10 features tongue and groove construction on the ends of each plank 10 in order to assure interlocking of flooring planks 10 abutting one another at the ends. To that end, a tongue 28 is machined substantially in the second layer 18 on one end of the flooring plank 10 as shown in FIGS. 1, 3 and 4. In the opposing end of the flooring plank a groove 30 is machined in the second layer 18 and is sized and shaped to mate with a corresponding tongue 28 on another flooring plank 10. Alternatively, the grooves and/or tongues may be formed in both the first and second layers or solely in the first layer.

In yet another embodiment according to the teachings of the present application the six sides comprised of the top side 14 of the top layer 12, the bottom side 38 shown in FIG. 2 of the bottom layer 18, the two ends of the plank 10 and the two sides of the plank 10 are coated with at least one coat of acrylic urethane in order to provide protection for the entire plank. The top side 14 of the plank may further include additional layers of acrylic urethane and/or aluminum oxide dependent on the particular wear resistance and finish desired, as discussed previously.

Although the apparatus constructed in accordance with the teachings of the present application has been described herein, the scope of the coverage of this disclosure is not limited thereto. On the contrary, the disclosure covers all embodiments of the teaching of the invention clearly falling within the scope of the appended claims either literally or under the doctrine of equivalents.

What is claimed is:

1. A flexible flooring system comprising a plurality of planks, each plank comprising:
   (a) a first top layer including a first plurality of strips that are secured together, each of the first plurality of the strips having a grain extending generally in a longitudinal direction of the plank; and
   (b) a second bottom layer including a second plurality of strips, each strip having a grain extending generally transversely to the longitudinal direction of the plank, wherein the second plurality of strip are spaced from one another by gaps having appropriate gap width, wherein the plurality of strips of the first layer are not perpendicular to the strips of the second layer.

2. The flexible flooring system of claim 1, wherein the second bottom layer comprises at least one tongue on one side configured to mate with at least one groove on one side of another or adjacent plank; and wherein the second bottom layer comprises at least one groove at the other side configured to receive at least one tongue of one side of another or adjacent plank.

3. The flexible flooring system of claim 2, wherein the tongue or groove extends along the length of the side of the plank.

4. The flexible flooring system of claim 1, wherein the strips are bamboo or wood.

5. The flexible flooring system of claim 1, wherein the second plurality of strips are spaced from one another by gaps having approximately equal gap width.

6. The flexible flooring system of claim 1, wherein the second plurality of strips are spaced from one another by gaps having 1 mm gap width.

7. The flexible flooring system of claim 1, wherein the second plurality of strips are spaced from one another by gaps having unequal gap width.

8. The flexible flooring system of claim 1, wherein the second plurality of strips is rough cut.

9. The flexible flooring system of claim 2, wherein the tongue or groove are machined on the second bottom layer.

10. The flexible flooring system of claim 1, further comprising at least one coat of acrylic urethane, aluminum oxide color or other suitable finishes disposed on multiple surfaces thereof.

11. The flexible flooring system of claim 1, wherein the surfaces of the strips are pre-finished or unfinished.

12. A flexible flooring system comprising a plurality of planks, each plank comprising:
   (a) a first top layer including a first plurality of strips that are secured together, each of the first plurality of the strips having a grain extending generally in a longitudinal direction of the plank; and
   (b) a second bottom layer including a second plurality of strips, each strip having a grain extending generally transversely to the longitudinal direction of the plank, wherein the second plurality of strips are spaced from one another by gaps having appropriate gap width;
   wherein the second bottom layer comprises at least one tongue on one side configured to mate with at least one groove on one side of another or adjacent plank; and wherein the second bottom layer comprises at least one groove at the other side configured to receive at least one tongue of one side of another or adjacent plank, wherein the plurality of strips of the first layer are not perpendicular to the strips of the second layer.

13. The flexible flooring system of claim 12, wherein the tongue or groove extends along the length of the side of the plank.

14. The flexible flooring system of claim 12, wherein the tongue or groove are machined on the second bottom layer.

15. A flexible flooring plank comprising:
   (a) a first top layer including a first plurality of strips that are secured together, each of the first plurality of the strips having a grain extending generally in a longitudinal direction of the plank; and
   (b) a second bottom layer including a second plurality of strips, each strip having a grain extending generally transversely to the longitudinal direction of the plank, wherein the second plurality of strips are spaced from one another by gaps having appropriate gap width,
   wherein the plurality of strips of the first layer are not perpendicular to the strips of the second layer.

16. The flexible flooring plank of claim 15, wherein the second bottom layer comprises at least one tongue on one side configured to mate with at least one groove on one side of another or adjacent plank; and wherein the second bottom layer comprises at least one groove at the other side configured to receive at least one tongue of one side of another or adjacent plank.

17. The flexible flooring plank of claim 16, wherein the tongue or groove extends along the length of the side of the plank.

18. The flexible flooring plank of claim 15, wherein the strips are bamboo or wood.

19. The flexible flooring plank of claim 15, wherein the second plurality of strips are spaced from one another by gaps having approximately equal gap width.

20. The flexible flooring plank of claim 15, wherein the second plurality of strips are spaced from one another by gaps having 1 mm gap width or unequal gap width.

* * * * *

UNITED STATES PATENT AND TRADEMARK OFFICE
CERTIFICATE OF CORRECTION

PATENT NO.        : 7,152,379 B2  
APPLICATION NO.   : 09/839078  
DATED             : December 26, 2006  
INVENTOR(S)       : Hai Lin et al.

It is certified that error appears in the above-identified patent and that said Letters Patent is hereby corrected as shown below:

TITLE PAGE, ITEM (56)  
The following reference should be appended to the list of "U.S. Patent Documents" on the issued patent as References Cited:

6,182,413 B1   7/1999   Magnusson

Signed and Sealed this

Sixteenth Day of October, 2007

JON W. DUDAS  
*Director of the United States Patent and Trademark Office*